(12) United States Patent
Masui

(10) Patent No.: US 7,170,419 B2
(45) Date of Patent: Jan. 30, 2007

(54) REMOTE KEY ENTRY SYSTEM

(75) Inventor: Hideaki Masui, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 152 days.

(21) Appl. No.: 10/843,417

(22) Filed: May 12, 2004

(65) Prior Publication Data
US 2004/0227639 A1 Nov. 18, 2004

(30) Foreign Application Priority Data
May 13, 2003 (JP) ............................. 2003-134196

(51) Int. Cl.
*G08B 25/08* (2006.01)
(52) U.S. Cl. .............. 340/692; 340/425.5; 340/426.23; 340/426.17; 340/502
(58) Field of Classification Search .......... 340/426.23, 340/426.17, 426.22, 502, 425.5, 692; 307/10.7, 307/173, 287
See application file for complete search history.

(56) References Cited

U.S. PATENT DOCUMENTS

| 4,996,515 A | * | 2/1991 | Schaffer et al. | ........ 340/426.23 |
| 5,382,941 A | * | 1/1995 | Arzoumanian | ......... 340/426.23 |
| 5,572,185 A | * | 11/1996 | Chen et al. | ............... 340/425.5 |
| 5,783,989 A | * | 7/1998 | Issa et al. | .............. 340/426.25 |
| 6,028,505 A | * | 2/2000 | Drori | .................... 340/426.17 |
| 6,814,170 B2 | * | 11/2004 | Abe et al. | .................. 180/65.2 |

* cited by examiner

*Primary Examiner*—Anh V. La
(74) *Attorney, Agent, or Firm*—Finnegan, Henderson, Farabow, Garrett & Dunner, L.L.P.

(57) ABSTRACT

A remote key entry system has a key unit and an answerback sound producing device. The key unit transmits a radio signal for remote-controlled locking and unlocking of a vehicle. The answerback sound producing device receives the key signal to indicate completion of correct locking or unlocking of the vehicle. The remote key entry system includes an environmental data sensing devices for obtaining data of an environment around the vehicle for control of the answerback sound. The system also has an answerback sound control device for controlling at least one of sound volume and tone of the answerback sound based on the environment data. The environmental data sensing device is an illumination sensing device for detecting environmental illuminance around the vehicle. The answerback sound control device varies the sound volume proportional to the illuminance. The environmental data sensing device may be a location calculating device for knowing location of the vehicle, and the answerback sound control device varies the sound volume based on the location of the vehicle.

7 Claims, 6 Drawing Sheets

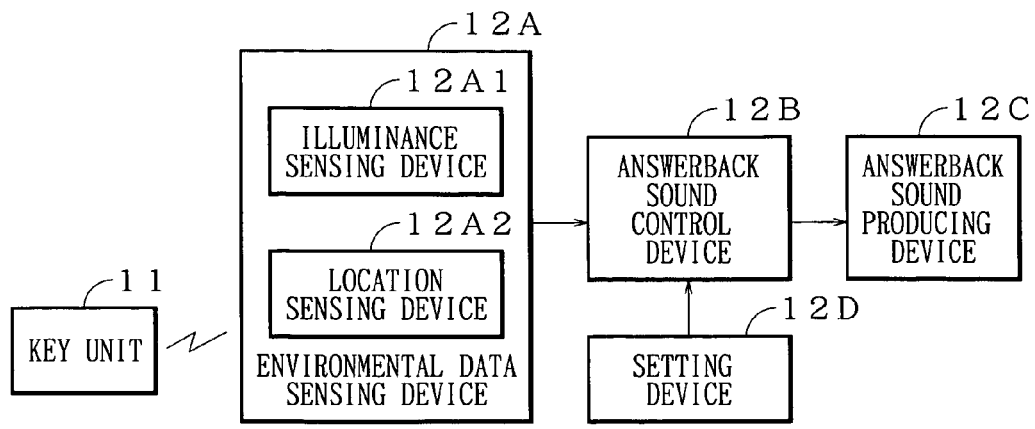
FIG. 1
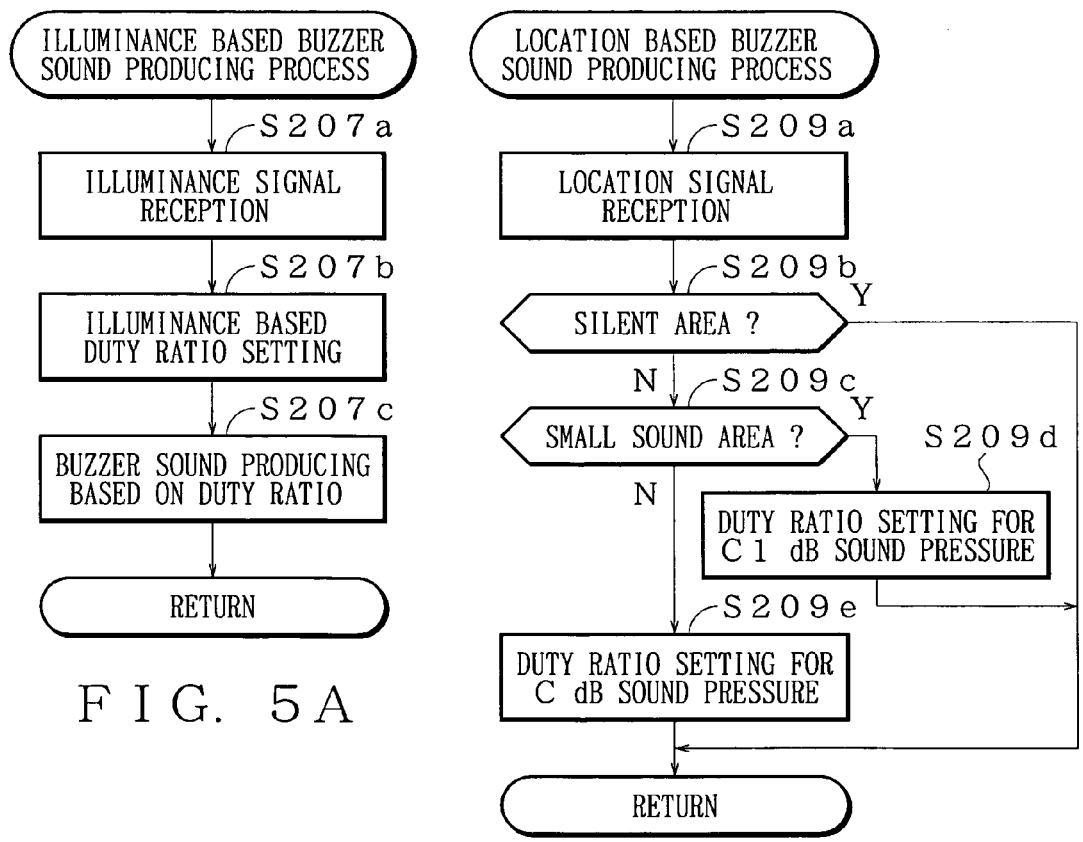
FIG. 5A
FIG. 5B

REMOTE KEY ENTRY SYSTEM

BACKGROUND OF THE INVENTION

1. Field of the Invention

The present invention relates to a remote key entry system of a motor vehicle, particularly to a remote key entry system providing an answerback sound in response to a radio key signal transmitted from a key unit.

2. Prior Art

Recently, most motor vehicles have a remote key entry system. Conventionally, such a system has a key unit and a vehicle side device receiving a radio key signal transmitted from the key unit for remote control of a vehicle. The remote key entry system provides an answerback signal to show completion of correct locking or unlocking of the vehicle. The answerback is, for example, flickering of a hazard lamp or producing of a buzzer sound.

However, a buzzer sound provided by the conventional remote key entry system has a fixed sound volume or tone to be audible in a noisy area. However, such buzzer sounds themselves may become noises. For example, the fixed buzzer sounds may be an annoyance to the neighbors particularly at midnight or in a place where a low noise is requested.

SUMMARY OF THE INVENTION

In view of the aforementioned situation, an object of the invention is to provide a remote key entry system that can control an answerback sound in consideration of an environment around a motor vehicle, eliminating a noise to the neighborhood.

For achieving the object, an aspect of the present invention is, as shown in a general block diagram of FIG. 1, a remote key entry system having a key unit 11 and an answerback sound producing device 12C. The key unit transmits a radio signal for remote-controlled locking of a vehicle, and the answerback sound producing device receives the key signal to indicate completion of correct locking of the vehicle. The remote key entry system includes:

- an environmental data sensing device 12A for obtaining data of an environment around the vehicle to control an answerback sound, and
- an answerback sound control device 12B for controlling at least one of sound volume and tone of the answerback sound based on the environment where the vehicle is parking.

Thus configured invention can control sound volume and tone of the answerback based on the environment data. This prevents the answerback sound from becoming a noise to the environment around the vehicle with maintaining an answerback function.

Preferably, the environmental data sensing device 12A is an illumination sensing device 12A1 for detecting environmental illuminance around the vehicle, and the answerback sound control device 12B varies the sound volume proportional to the illuminance.

Thus, the answerback sound varies proportional to the illuminance around the vehicle, so that the answerback sound volume becomes smaller, for example, at midnight.

Preferably, the illumination sensing device 12A1 makes use of a sensor for automatically lighting a night light of the vehicle. This requires no additional sensor for control of the answerback sound.

Preferably, the environmental data sensing device 12A is a location calculating device 12A2 for knowing location of the vehicle, and the answerback sound control device 12B varies the sound volume based on the location of the vehicle. This can prevent the answerback sound from becoming a noise to the neighborhood where a quiet environment is to be maintained.

Preferably, the location calculating device 12A2 utilizes a navigation device for detecting the location of the vehicle based on GPS signals. Thus, the answerback sound can be controlled with no additional specified device since such a navigation device that is equipped in most of motor vehicles.

Preferably, as shown in FIG. 1, the remote key entry system has a device 12D for setting the sound volume to any one of zero, a given value other than zero, and a variable value determined based on the environmental data. Thus, a user can make use of the system in a customized way based on a situation of the vehicle.

BRIEF DESCRIPTIONS OF THE DRAWINGS

FIG. 1 is a block diagram showing a basic configuration of the present invention;

Figure 4:
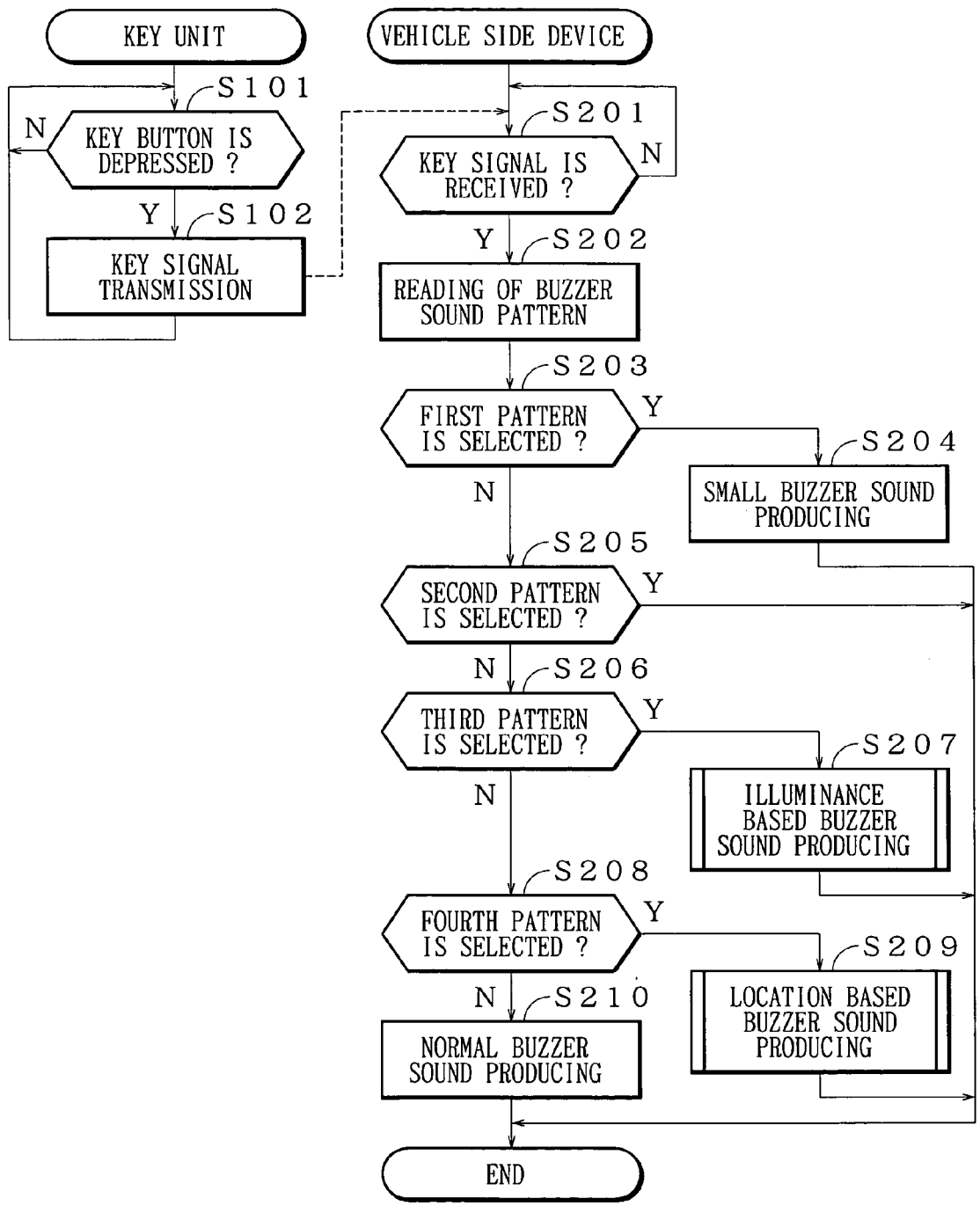
FIG. 4 is a flowchart showing steps for producing a buzzer sound according to the present invention.
Figure 6:
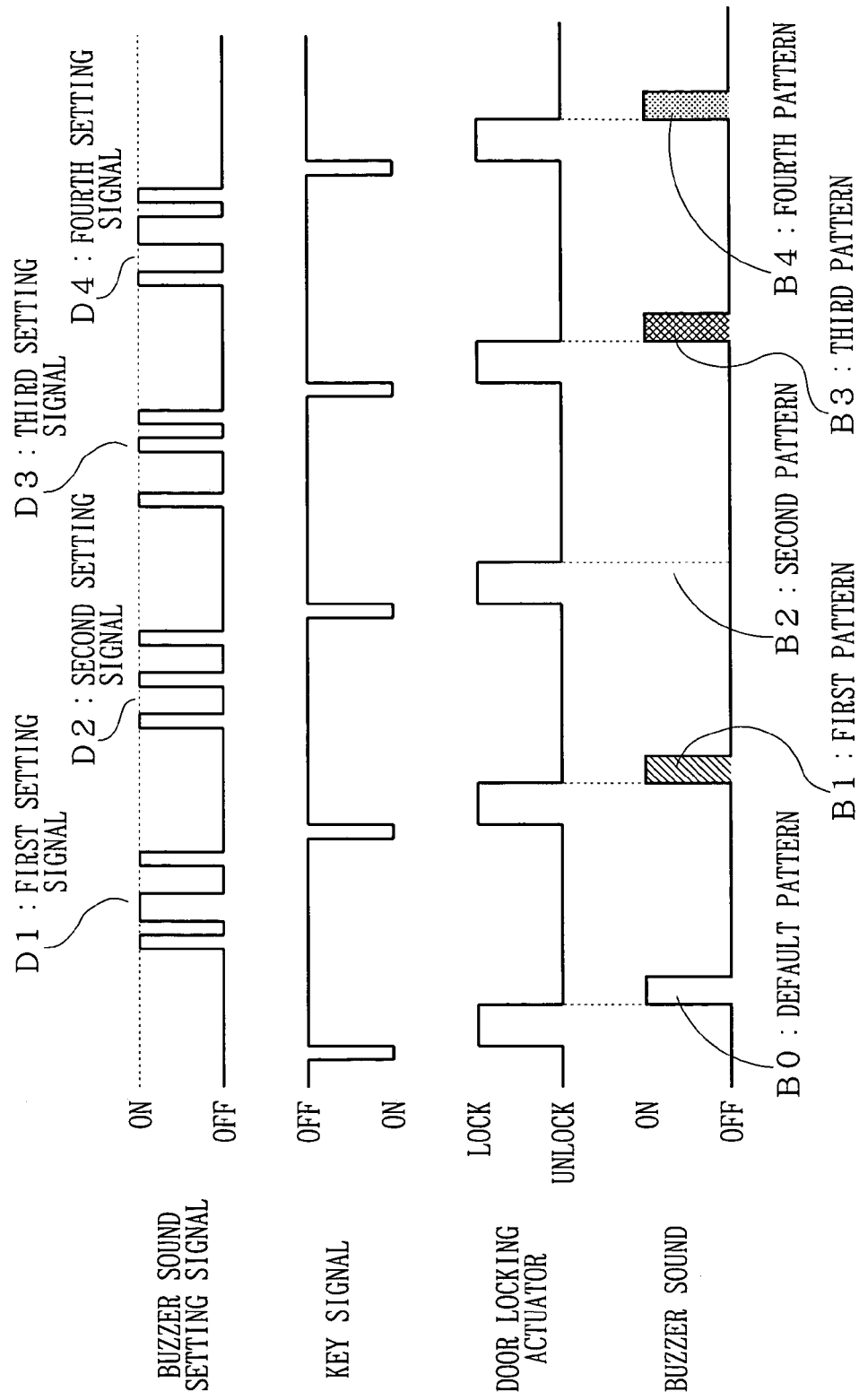
Figure 7:
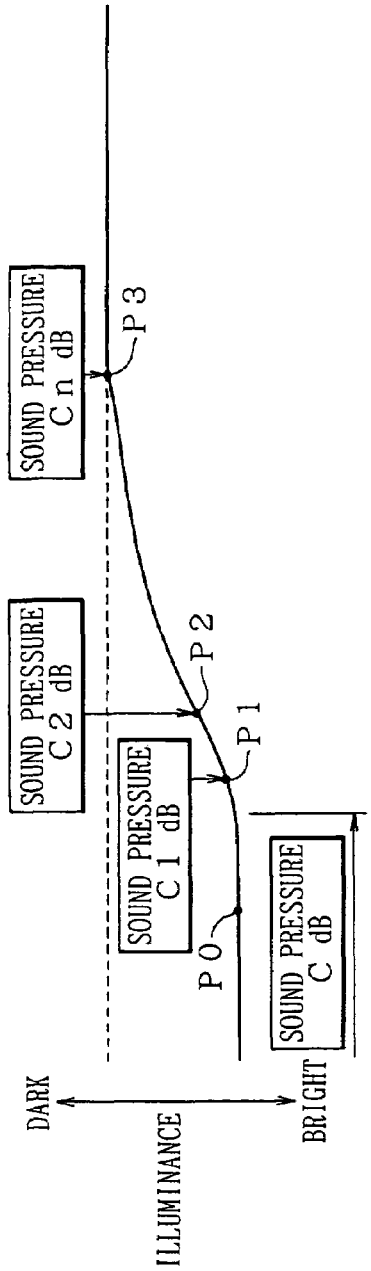
Figure 8:
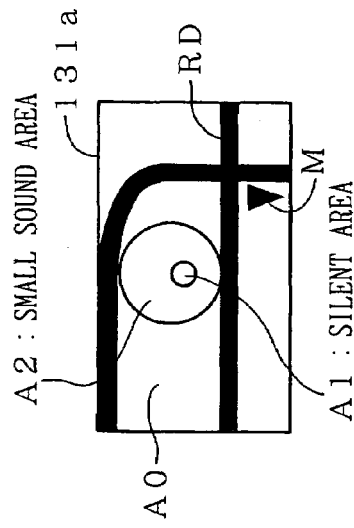

FIGS. 5A and 5B each are a flowchart for showing steps for producing a buzzer sound in response to illuminance or location in respect of FIG. 4;

FIG. 6 is a time chart example showing several types of signals according to the present invention;

FIG. 7 is a graph showing relationships between environmental illuminance and buzzer sound pressure; and FIG. 8 is an illustration for showing areas divided to control the buzzer sound.

PREFERRED EMBODIMENTS OF THE INVENTION

Referring to the accompanied drawings, embodiments of the present invention will be discussed.

Figure 2:
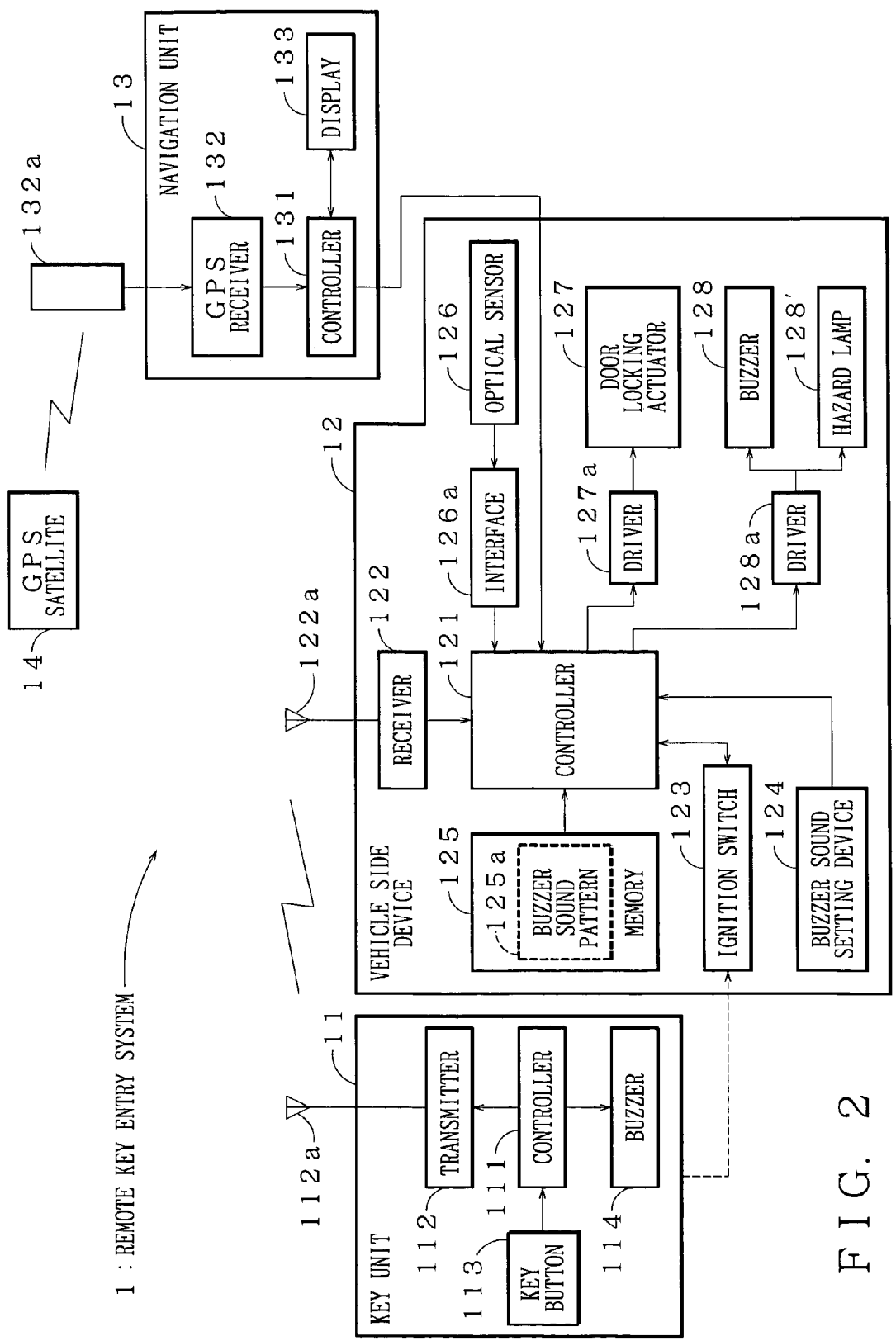
FIG. 2 is a block diagram showing a general configuration of a remote key entry system according to the present invention.

As shown in FIG. 2, the remote key entry system 1 has a key unit 11 and a vehicle mounted device 12. A vehicle is equipped with a navigation unit 13 that is a part of the vehicle mounted device 12.

The key unit 11 is small enough to be portable for a driver of the vehicle. The key unit 11 has a controller 111, a transmitter 112, a key button 113, and a buzzer 114. The key unit 11 also has a car key and a small button battery (not shown) that is a power source for the controller 111, the transmitter 112, the buzzer 114, etc. The controller 111 is a computer consisting of a CPU (central process unit), a ROM (read only memory), and a RAM (random access memory). The CPU executes various kinds of processes associated with remote key entry along a control program stored in the RAM. The RAM stores data required for various executions of the CPU. The ROM stores data for identification of the present vehicle.

The controller 111 commands the transmitter 112 in response to depression of the key button 113 such that a radio key signal for remote control of locking and unlocking of the vehicle is transmitted via an antenna 112a together with an identification signal. At the same time, the controller 111 issues a command to the buzzer 114 to output a buzzer sound to show depression of the key button 113. The buzzer sound has volume negligibly small as compared with an answerback sound (discussed later) output from the vehicle mounted device 12.

Meanwhile, the vehicle mounted device 12 has a controller 121, a receiver 122, an ignition switch 123, a buzzer sound setting device 124, a memory 125, an optical sensor 126, a door locking actuator 127, a buzzer 128, and a hazard lamp 128'.

The controller 121 is a micro computer having a CPU, a ROM, and a RAM. The CPU executes various processes associated with remote key entry of the present invention along a control program stored in the ROM. The RAM stores data required for various executions of the CPU.

The receiver 122 of the controller 121 receives an identification signal and a key signal transmitted from the key unit 11 via an antenna 122a. When the identification signal is confirmed to coincide with an associated data of the vehicle, various processes for remote key entry according to the present invention are executed.

With insertion and turning of a car key included in the key unit 11, an ignition switch 123 starts an engine. The buzzer sound setting device 124 can provide a customized buzzer sound by utilizing in-line package switches or a conventional logic setting device. The buzzer sound setting device 124 corresponds to a setting device described in claims.

The memory 125 preliminarily stores a buzzer sound pattern 125a (discussed later) set by the buzzer sound setting device 124. The memory 125 is, for example, an EEPROM (electrically erasable and programmable ROM). A buzzer sound of the vehicle mounted device 12 corresponds to an answerback sound described in claims.

The optical sensor 126 detects illuminance of an environment around the vehicle. The illuminance is converted to a digital signal in an interface 126a to be output to the controller 121. The optical sensor 126 may be provided exclusively for remote key entry but may make use of an light sensor for automatic lighting of a night light of the vehicle, reducing a manufacturing cost of the system. The optical sensor 126 corresponds to an environmental data sensing devices, particularly to an illumination sensing device described in claims.

The door locking actuator 127 responds to a signal from a driver 127a commanded by the controller 131 to lock or unlock the vehicle. The buzzer 128 produces a buzzer sound in response to a command signal output from a driver 128a. The buzzer sound is associated with the buzzer sound pattern 125a set preliminarily. Furthermore, the hazard lamp 128' flickers also in response to a signal output from the driver 128a by the controller 131.

The controller 121 of the vehicle mounted device 12 is also connected to the navigation unit 13. The navigation unit 13 has a controller 131, a GPS receiver 132 for GPS (global positioning systems), and a display 133. The controller 131 is a computer having a CPU, a ROM, and a RAM. The CPU executes processes including location calculation of the vehicle. The RAM selectively stores data required for executing the processes. The navigation unit 13 corresponds to an environmental data sensing device, particular to a location calculating device described in claims.

The controller 131 calculates location data including latitude and longitude of the vehicle form signals obtained by a GPS satellite 14 via an antenna 132a. The controller 121 indicates a location mark on an electronic map indicated on the display 133. The controller 121 determines whether the vehicle is positioned in a smaller sound area or a silent area based on the location data, and the decision is output to the vehicle mounted device 12. However, the determination may be made by the controller 121 of the vehicle mounted device 12, in which the navigation unit 13 outputs the calculated location data to the vehicle mounted device 12.

The navigation unit 13 corresponds to a location calculating device described in claims. The location calculating device may be another GPS receiver functionally equal to the navigation unit 13. However, the navigation unit 13 is better to reduce a manufacturing cost of the system since most of motor vehicles have such a navigation unit.

Figure 3:
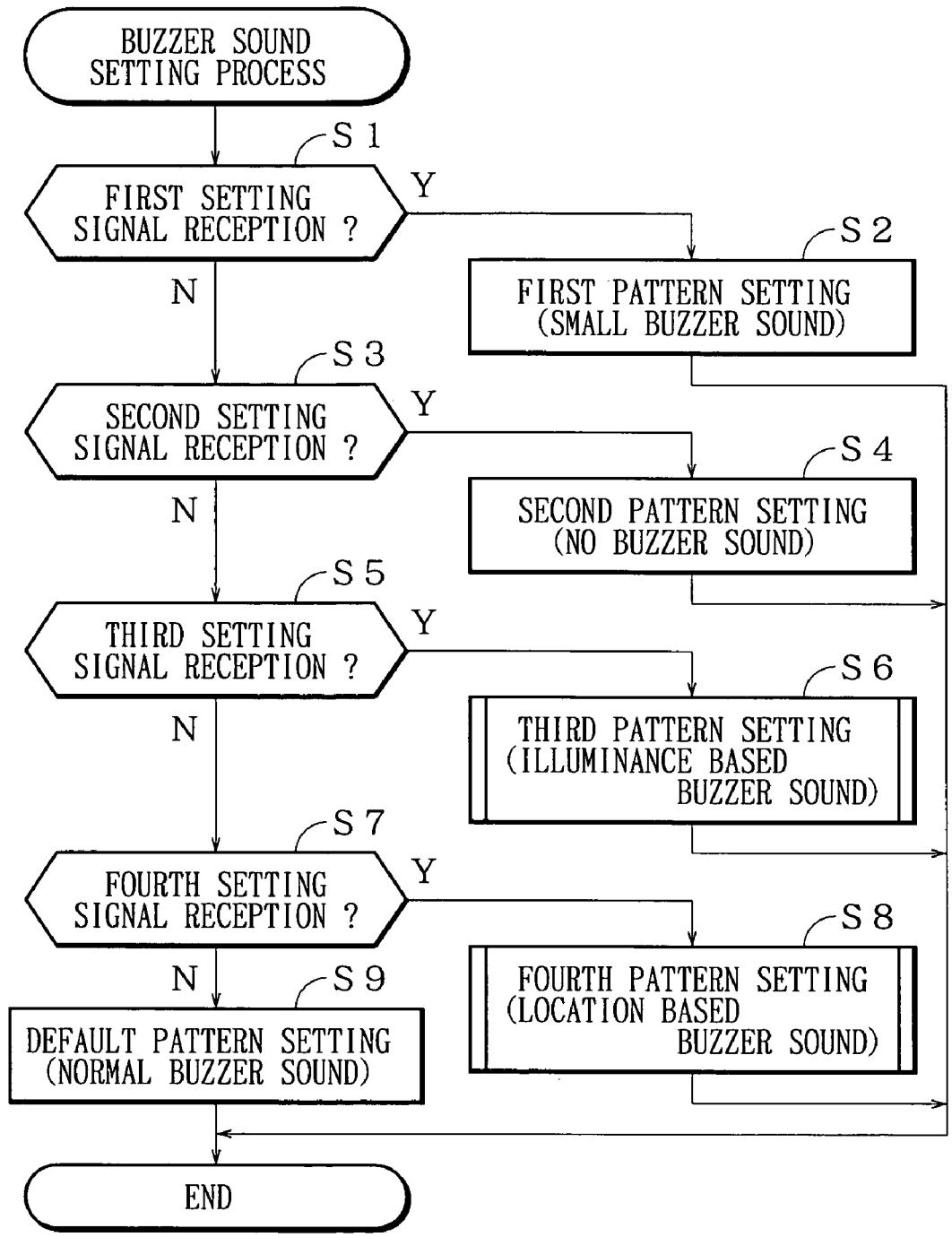
FIG. 3 is a flowchart explanatorily showing a buzzer sound setting process according to the present invention.

Referring to FIG. 3 together with FIGS. 6 to 8, a buzzer sound setting process according to the present invention will be discussed. The buzzer sound setting process of FIG. 3 shows steps where the controller 121 sets a buzzer sound pattern 125a in the memory 125 in response to operation of the buzzer sound setting device 124 of the vehicle mounted device 12.

As shown in FIGS. 3 and 6, a first pattern B1 is set (Y at step S1, and step 2) in response to a first set signal D1; a second pattern B2 is set (Y at step 3, and step 4) in response to a second set signal D2; a third pattern B3 is set (Y at step 5, and step 6) in response to a second set signal D3; and a fourth pattern B4 is set (Y at step 7, and step 8) in response to a second set signal D4. When none of signals D1 to D4 are recognized, a default pattern B0 is set(N at step 7, and step 9).

Referring further to patterns B0, B1, B3, and B4, firstly, default pattern B0 has a given basic frequency and a basic duty ratio corresponding to a sound volume audible in a noisy area as well as the conventional art. First pattern B1 has a duty ratio corresponding to a sound volume smaller than that of pattern B0. Second pattern B2 is a silent mode.

Third pattern B3 has a sound pressure corresponding to an illuminance. More definitely, as shown in FIG. 7, the sound pressure varies to have a duty ratio in response to illuminance detected by the optical sensor 126. For example, with reception of a key signal, a duty ratio is set to provide a sound pressure C db in response to a sufficiently bright illuminance P0 around the vehicle. The sound pressure is equal to that of default pattern B0. A duty ratio is set to provide n sound pressure grade of C1 db, C2 db, . . . , or Cn db in response to an environmental illumination grade P1, P2, . . . , or Pn. The sound pressure decreases with decrease of the illuminance.

Pattern B4 has a sound volume corresponding to the location where the vehicle M is parking. As shown in FIG. 8, on reception of a key signal, a duty ratio is controlled to vary the buzzer sound pressure based on the place where the vehicle is parking. A duty ratio is set to provide the buzzer sound pressure C db when the vehicle M is positioned in a normal area A0 based on a calculated location data. A duty ratio is set to provide the buzzer sound pressure C1 db when the vehicle M is determined to be positioned in a small sound area A2. Furthermore, a duty ratio is set to provide the buzzer sound pressure C2 db or no sound when the vehicle M is determined to be positioned in a silent area A1. Note that RD designates a road in FIG. 8.

These buzzer sound setting processes provide customization of the buzzer sound in conformity with parking places for a vehicle user.

Referring to FIGS. 4 and 5 together with FIGS. 6 to 8, process for producing a buzzer sound according to the present invention will be discussed.

In FIG. 4, the key unit 11 stands by for depression of key button 113 (N at step 101). Depression of the key button 113 (Y at step 101) executes step 102 to transmit a radio key signal from the transmitter 112. At the same time, the buzzer 114 provides a considerably small sound.

Meanwhile, as shown in step 201, the vehicle mounted device 12 stands by for receiving a key signal transmitted from the key unit 11 (N at step 201). Reception of a key signal forwards the execution to step 202 (Y at step 201).

Step 202 reads out a buzzer sound pattern 125a stored in the memory 125. The buzzer sound pattern 125a has been set by the processes shown in FIG. 3. The door locking actuator 127 moves for locking and unlocking of the vehicle in response to a key signal as shown in FIG. 6, though it is not illustrated in the flowcharts.

When the red-out buzzer sound pattern 125a is first pattern B1, the buzzer 128 provides a small buzzer sound (Y at step 203, and step 204); when the buzzer sound pattern 125a is second pattern B2, the buzzer 128 provides no buzzer sound (N at step 203, and Y step 205); when the buzzer sound pattern 125a is third pattern B3, the buzzer 128 provides a buzzer sound corresponding to the illuminance (Y at step 206, and step 207); when the buzzer sound pattern 125a is fourth pattern B4, the buzzer 128 provides a buzzer sound corresponding to the parking location (Y at step 208, and step 209); and when the buzzer sound pattern 125a is none of patterns B1, B2, B3, and B4, the buzzer 128 provides a normal buzzer sound (N at step 208, and step 210).

Referring further to processes for producing buzzer sounds, a duty ratio is set based on first pattern B1 to reduce sound pressure for a small buzzer sound in step 204. In step 210, a given basic frequency and a basic duty ratio are set based on the default pattern B0 to provide a buzzer sound with a normal sound volume.

Step 207, as shown in a sub-routine of FIG. 5A, obtains illuminance by the optical sensor 126 (step 207a). As corresponding to the obtained illuminance, a duty ratio is set (step 207b) to provide a buzzer sound corresponding to the duty ratio (step 207c). The duty ratio is determined as discussed with FIG. 7, and the duty ratio provides a buzzer sound corresponding to the associated illuminance. That is, The duty ratio is controlled to reduce the sound pressure with increase of darkness around the vehicle. Note that decrease of buzzer sound pressure is proportional to decrease of sound volume. Since the buzzer sound volume is determined to vary proportionally to the illuminance around the vehicle, the buzzer sound volume becomes smaller at midnight with a less illuminance, providing no annoyance to the neighborhood.

FIG. 5B shows a sub-routine 209 for providing a buzzer sound corresponding to parking location of the vehicle. The navigation unit 13 outputs location data (step 209a). When the location data shows that the vehicle is positioned in a silent area, no sound is provided (Y at step 209b). When the location data shows that the vehicle is positioned in a smaller sound area, a duty ratio of the buzzer sound is set to provide sound pressure C1 db (Y at step 209c, and step 209d). In the other cases, the duty ratio is set to be a sound pressure C db (N at step 209c, and step 209e). In other words, no buzzer sound is provided when the vehicle is positioned in the silent area A1; a smaller buzzer sound is provided in the smaller sound area A2; and a normal buzzer sound is provided in the other area or the normal sound area A0. Thus, the sound volume of the buzzer varies based on the location of the vehicle, providing no annoyance to the neighborhood where a quiet environment is to be maintained.

Thus, in the embodiment of the present invention, the answerback sound is controlled based on an environmental condition such as illuminance and location of the vehicle. Accordingly, a noise due to the answerback sound is prevented, while an answerback function can be kept as desired.

The embodiment can be modified within the sprit of the present invention. For example, the buzzer sound may be controlled in tone as well as in sound volume. The tone may be preferably selected to have a frequency lower than a normal one at midnight or in a place where a quiet environment is to be maintained. Sound volume and tone may be controlled at the same time. In another embodiment, a GPS portable phone or a specified GPS receiver device may be employed in place of the navigation system to obtain location data.

In further another embodiment, an amplitude of the buzzer sound may be controlled directly in place of sound pressure control utilizing the duty ratio. In further another embodiment, more detailed classification may be provided in type of the buzzer sound with combination of illuminance and location of the vehicle. In further another embodiment, the buzzer sound may be controlled based on daytime or night with use of clock data obtained by a GPS signal or a timer in a CPU.

What is claimed is:

1. A remote key entry system comprising:
   a key unit for transmitting a radio signal for remote-controlled locking and unlocking of a vehicle;
   an answerback sound producing device for receiving the key signal to indicate completion of correct locking or unlocking of the vehicle;
   an environmental data sensing device for obtaining data of an environment around the vehicle to control the answerback sound;
   an answerback sound control device for controlling sound volume of the answerback sound based on the environment data; and
   a device for selectively setting the sound volume to one of at least three volume settings including zero, a given value other than zero, and a variable value determined based on the environmental data.

2. The remote key entry system according to claim 1 wherein the environmental data sensing device is an illumination sensing device for detecting environmental illuminance around the vehicle, and the answerback sound control device varies the sound volume proportional to the illuminance.

3. The remote key entry system according to claim 2 wherein the illumination sensing device makes use of a sensor for automatically lighting a night light of the vehicle.

4. The remote key entry system according to claim 2 wherein the answerback sound control device varies the sound volume to one of at least three volume settings.

5. A remote key entry system comprising:
   a key unit for transmitting a radio signal for remote controlled locking and unlocking of a vehicle;
   an answerback sound producing device for receiving the key signal to indicate completion of correct locking or unlocking of the vehicle;
   an environmental data sensing device for obtaining data of an environment around the vehicle to control the answerback sound; and
   an answerback sound control device for controlling tone of the answerback sound based on the environment data.

6. The remote key entry system according to claim 1 further comprising a device for setting the sound volume to any one of zero, a given value other than zero, and a variable value determined based on the environmental data.

7. The remote key entry system according to claim 6 wherein the location calculating device utilizes a navigation device for knowing the location of the vehicle based on GPS signals.

* * * * *

UNITED STATES PATENT AND TRADEMARK OFFICE
CERTIFICATE OF CORRECTION

| | |
|---|---|
| PATENT NO. | : 7,170,419 B2 |
| APPLICATION NO. | : 10/843417 |
| DATED | : January 30, 2007 |
| INVENTOR(S) | : Hideaki Masui |

It is certified that error appears in the above-identified patent and that said Letters Patent is hereby corrected as shown below:

Col. 6, Line 58 *Claim 6, should read

-- 6. A remote key entry system comprising:

a key unit for transmitting a radio signal for remote-controlled locking and unlocking of a vehicle;

an answerback sound producing device for receiving the key signal to indicate completion of correct locking or unlocking of the vehicle;

an environment sensing device for obtaining data of an environment around the vehicle to control the answerback sound; and an answerback sound control device for controlling sound volume of the answerback sound based on the environment data, wherein the environmental data sensing device is a location calculating device for knowing <u>the</u> location of the vehicle, and the answerback sound control device varies the sound volume based on the location of the vehicle.

Signed and Sealed this

Seventh Day of October, 2008

JON W. DUDAS
*Director of the United States Patent and Trademark Office*